US012613171B2

(12) United States Patent
Hong

(10) Patent No.: US 12,613,171 B2
(45) Date of Patent: Apr. 28, 2026

(54) BATTERY CELL STRENGTH TEST JIG AND BATTERY CELL STRENGTH TEST DEVICE

(71) Applicant: LG ENERGY SOLUTION, LTD., Seoul (KR)

(72) Inventor: Myung Su Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 280 days.

(21) Appl. No.: 18/273,537

(22) PCT Filed: Oct. 17, 2022

(86) PCT No.: PCT/KR2022/015749
§ 371 (c)(1),
(2) Date: Jul. 20, 2023

(87) PCT Pub. No.: WO2023/068706
PCT Pub. Date: Apr. 27, 2023

(65) Prior Publication Data
US 2024/0085289 A1      Mar. 14, 2024

(30) Foreign Application Priority Data
Oct. 22, 2021    (KR) ........................ 10-2021-0141746

(51) Int. Cl.
| | |
|---|---|
| *G01N 3/08* | (2006.01) |
| *G01M 99/00* | (2011.01) |
| *G01N 3/02* | (2006.01) |
| *G01R 31/385* | (2019.01) |
| *H01M 10/42* | (2006.01) |

(52) U.S. Cl.
CPC ................. *G01N 3/08* (2013.01); *G01N 3/02* (2013.01); *H01M 10/4285* (2013.01)

(58) Field of Classification Search
CPC ........ G01N 3/08; G01N 3/02; H01M 10/4285
USPC .......................................................... 73/831
See application file for complete search history.

(56) References Cited

U.S. PATENT DOCUMENTS

| | | |
|---|---|---|
| 2019/0064277 A1 | 2/2019 | Cai et al. |
| 2019/0152001 A1 | 5/2019 | Cai et al. |

FOREIGN PATENT DOCUMENTS

| | | |
|---|---|---|
| CN | 207850839 U | 9/2018 |
| CN | 110783657 A | 2/2020 |
| JP | H9-97822 A | 4/1997 |
| JP | 200088726 A | 3/2000 |
| JP | 2002343318 A | 11/2002 |
| JP | 2009156866 A | 7/2009 |
| JP | 6033969 B2 | 11/2016 |
| JP | 202165060 A | 4/2021 |
| KR | 2001-0104454 A | 11/2001 |
| KR | 10-1111078 B1 | 2/2012 |

(Continued)

*Primary Examiner* — Brandi N Hopkins
(74) *Attorney, Agent, or Firm* — Bryan Cave Leighton Paisner LLP

(57) ABSTRACT

A battery cell strength testing jig includes a lead gripper in which an electrode lead drawn out from a side portion of a battery cell is fixed. The battery cell strength testing jig further includes a cell fixing member in which the battery cell is fixed. The cell fixing member is installed to be movable in a thickness direction of the battery cell. A relative displacement occurs between a cell body portion and the electrode lead of the battery cell when the cell fixing member is moved.

19 Claims, 12 Drawing Sheets

(56)           References Cited

FOREIGN PATENT DOCUMENTS

| KR | 10-2015-0037076 | A |   | 4/2015 |   |
|----|-----------------|---|---|--------|---|
| KR | 10-2015-0061825 | A |   | 6/2015 |   |
| KR | 10-1756153 | B1 |   | 7/2017 |   |
| KR | 1020180087040 | A |   | 8/2018 |   |
| KR | 1020180087041 | A |   | 8/2018 |   |
| KR | 101949106 | B1 | * | 2/2019 | ........ H01M 10/4285 |
| KR | 10-1983849 | B1 |   | 9/2019 |   |
| KR | 10-2146945 | B1 |   | 8/2020 |   |
| KR | 10-2021-0055363 | A |   | 5/2021 |   |
| KR | 10-2021-0125134 | A |   | 10/2021 |   |
| KR | 10-2315918 | B1 |   | 10/2021 |   |

* cited by examiner

112

114b

114a

111

BATTERY CELL STRENGTH TEST JIG AND BATTERY CELL STRENGTH TEST DEVICE

CROSS-REFERENCE TO RELATED APPLICATION

This application is a National Phase entry pursuant to 35 U.S.C. 371 of International Application No. PCT/KR2022/015749 filed on Oct. 17, 2022, which claims priority to and the benefit of Korean Patent Application No. 10-2021-0141746, filed on Oct. 22, 2021, and the entire contents of the Korean patent application are incorporated herein by reference.

TECHNICAL FIELD

The present disclosure relates to a battery cell strength testing jig and a battery strength testing apparatus.

More specifically, the present disclosure relates to the battery cell strength testing jig that generates relative displacement in a terrace portion of a cell where a cell body portion and an electrode lead of a battery cell is connected.

In addition, the present disclosure relates to the battery cell strength testing apparatus that tests the strength of a terrace portion by simulating swelling, and that can be applied to a battery module design.

BACKGROUND

Recently, secondary batteries capable of charging and discharging are widely being used as a power source for wireless mobile devices.

In addition, secondary batteries are drawing attention not only as a power source for mobile devices such as mobile phones, smartphones, laptops, and camcorders, but also as a power source for electric vehicles and hybrid electric vehicles that are suggested as measures to solve air pollution caused by conventional gasoline vehicles and diesel vehicles that use fossil fuels.

Therefore, the kinds of application that use a secondary battery are being greatly diversified due to the advantages of the secondary battery, and the secondary battery is expected to be applied to various fields and appliances in the future than it is now.

Such secondary battery can be classified into a lithium-ion battery, a lithium-ion polymer battery, a lithium polymer battery, etc. depending on the composition of an electrode and electrolyte, and the usage of a lithium-ion polymer battery, which is easy to be manufactured and is less likely to have electrolyte leakage, has been increasing.

Generally, depending on the shape of the battery case, a secondary battery can be classified into a cylindrical battery and a prismatic battery each having an electrode assembly embedded into a cylindrical or a prismatic metal can, and a pouch-type battery electrode assembly embedded into a pouch-type case with an aluminum laminated sheet.

Also, the electrode assembly embedded into the battery case is capable of charging and discharging by being composed of a cathode, an anode, and a separation membrane interposed between the cathode and the anode, and it is classified into a jelly-roll type that is wrapped after interposing the separation membrane between a long sheet-type cathode and anode coated with an active material, and a stack type that sequentially stacks multiple cathodes and anodes with a predetermined size interposed onto the separation membrane.

Here, because electric vehicles, etc. use a high-power electrical energy, they require multiple battery modules, and these battery modules have multiple battery cells connected in series or parallel on the inside.

In the battery module described above, swelling, a phenomenon where a battery cell swells in a surface direction as the battery cell on the inside repeatedly gets charged and discharged.

When swelling occurs, relative displacement occurs in a terrace portion of a cell, which is a connecting portion between a cell body portion and an electrode lead of the battery cell, and there is a problem of the cell body portion and the electrode lead being disconnected due to the relative displacement occurring between the cell body portion and electrode lead.

Additionally, in extreme cases of swelling, there may be a problem of safety related issues such as having a risk of fire or explosion in the battery cell.

Accordingly, while it is necessary that the strength between the cell body portion and the electrode lead of the battery cell should be tested to be reflected to the battery module design, swelling with respect to the test subject in the battery module production process is still at the level of conducting a computer simulation, and there is no separate normalized testing apparatus and a testing method for strength testing a cell body portion or a cell terrace portion of a manufactured battery cell.

Therefore, in order to design and manufacture a stable battery module, a data on the strength of the terrace portion of a battery cell is needed, and a simulation test should be executed to test the strength of a cell body portion and an electrode lead depending on the relative displacement occurring between the cell body portion and the electrode lead of the battery cell due to swelling, which makes the battery cell to swell in the surface direction.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is directed to solve above-mentioned problems, and it is directed to provide a battery cell strength testing jig that generates relative displacement of a cell body portion and an electrode lead of a battery cell.

Also, it is directed to provide a battery cell strength testing apparatus that can test the strength of a cell body portion and an electrode lead by generating relative displacement between the cell body portion and the electrode lead of the battery cell.

In addition, it is directed to provide the battery cell strength testing apparatus that measures a load and limit load between the cell body portion and the electrode lead of a battery module by simulating swelling, and reflects measured movement displacement and load value to a design and manufacture of the battery module.

In one aspect of the present disclosure, a battery cell strength testing jig may include a lead gripper in which an electrode lead drawn out from a side portion of a battery cell is fixed; and a cell fixing member in which the battery cell is fixed. The cell fixing member may be installed to be movable in a thickness direction of the battery cell. A relative displacement may occur between a cell body portion and the electrode lead of the battery cell when the cell fixing member is moved.

In other aspects, a battery cell strength testing jig described herein may include one or more of the following features. The lead gripper may include a lower side lead gripper and an upper side lead gripper. The electrode lead of the battery cell may be placed on an upper surface of the lower side lead gripper, and an upper side lead gripper may be coupled to an upper portion of the lower side lead gripper to fix the electrode lead. The upper surface of the lower side lead gripper and a lower surface of the upper side lead gripper may be knurled. At least one of the upper surface of the lower lead gripper or the lower surface of the upper lead gripper may include a first stepped portion, the other one of the at least one of the upper surface or the lower surface may be provided with a second stepped portion matching the first stepped portion, and the electrode lead may be fixed between the first stepped portion and the second stepped portion. At least one of the upper surface of the lower lead gripper or the lower surface of the upper lead gripper may include a lead groove in which the electrode lead is placed, and the other one of the at least one of the upper surface or the lower surface may be provided with a coupling piece coupled to the lead groove. The cell fixing member may include a cell holder in which the battery cell is placed, and the cell fixing member may include a fixing block coupled to an upper part of the cell holder. The cell holder may include a seating groove in which the battery cell is placed. A moving member coupled to the fixing block may be provided above the cell fixing member to move the cell fixing member. The battery cell fixed onto the cell fixing member may be at least one of a two-way battery cell that includes electrode leads on both sides or a one-way battery cell that includes a one-way battery electrode lead on one side. A base, to which the lead gripper is slidably coupled, may be provided below the lead gripper. The base may include a rail protruding from upper surface of the base, and the lead gripper may be provided with a sliding block having a rail groove slidably coupled to the rail. A stopper may be coupled to the rail of the base to regulate a movement of the lead gripper. The stopper may be coupled to a front of the lead gripper and a rear of the lead gripper, and the stopper may fix the lead gripper.

In another aspect of the present disclosure, a battery cell strength testing apparatus may include a lead gripper in which an electrode lead drawn out from a side portion of a battery cell is fixed; a cell fixing member in which the battery cell is fixed. The cell fixing member may be installed to be movable in a thickness direction of the battery cell, and a tensile strength tester coupled to an upper portion of the cell fixing member. The tensile strength tester may relatively displace a cell body portion with respect to the electrode lead to apply a load to the cell body portion of the battery cell when the cell fixing member is moved in the thickness direction of the battery cell. The tensile strength tester may be provided with a load detection sensor to measure the load or limit load applied to the cell body portion or the cell terrace portion of the battery cell.

According to the present disclosure, the strength generated from the cell body portion and the terrace portion of the electrode lead can be tested by generating relative displacement in the cell body portion and the electrode lead of the battery cell.

Also, the load and limit load generated in the cell body portion and the terrace portion connected to the electrode lead can be measured.

In addition, breakage and damage of the battery cell can be prevented by predicting the strength between the cell body portion and the electrode lead of the battery cell by simulating swelling, and by reflecting movement displacement and load value to the design and manufacture of the battery module.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
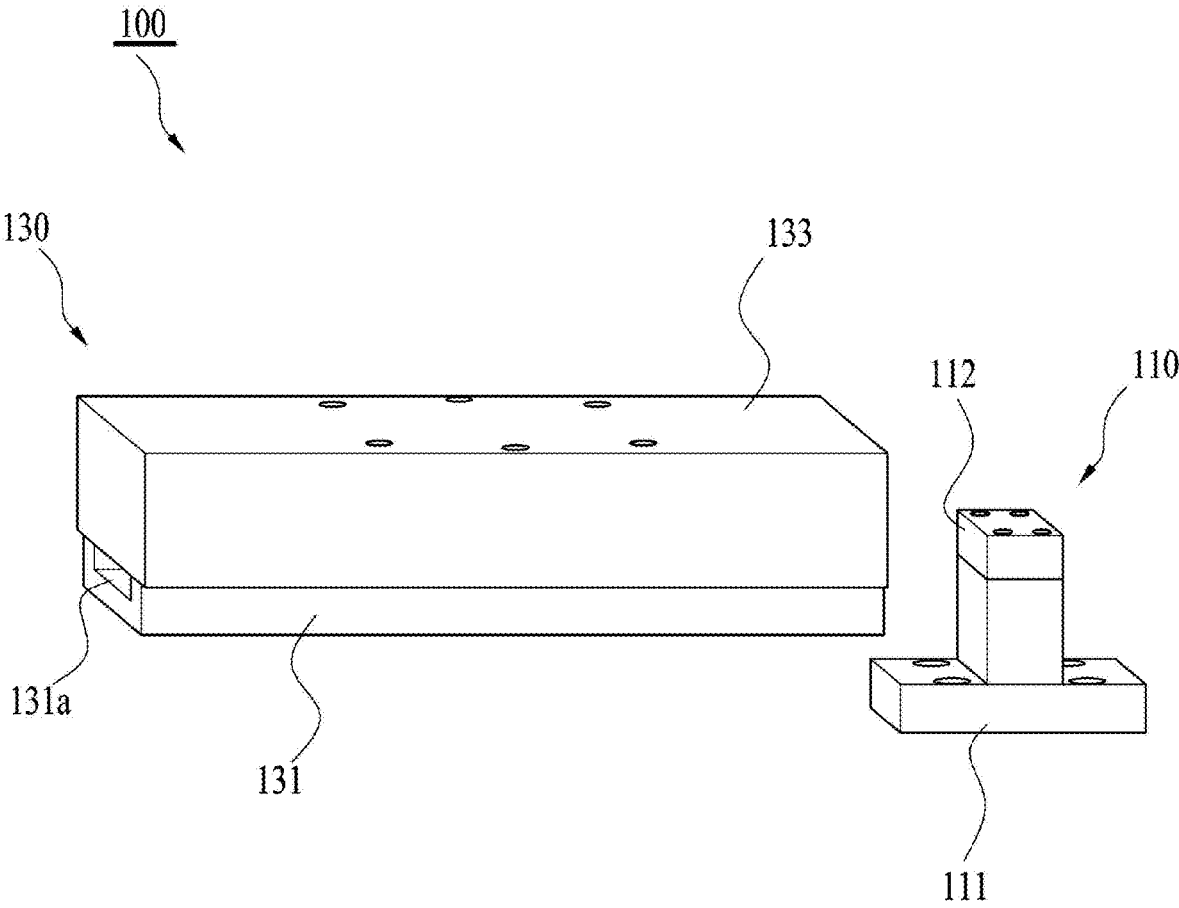
FIG. 1 is a diagram schematically illustrating a battery cell strength testing jig by an exemplary embodiment of the present disclosure.

The present disclosure provides a battery cell strength testing jig that includes a lead gripper in which an electrode lead drawn out from a side portion of a battery cell is fixed;

and a cell fixing member in which the battery cell is fixed and is installed to be movable in the thickness direction of the battery cell; and a relative displacement occurs between a cell body portion and an electrode lead of the battery cell by moving of the cell fixing member.

Also, the present disclosure provides a battery cell strength testing apparatus that includes a lead gripper in which an electrode lead drawn out from a side portion of a battery cell is fixed; a cell fixing member in which the battery cell is fixed and is installed to be movable in the thickness direction of the battery cell; and a tensile strength tester coupled to the upper portion of the cell fixing member; and wherein the tensile strength tester relatively displaces a cell body portion with respect to the electrode lead so a load is applied to the cell body portion of the battery cell by moving the cell fixing member in the thickness direction of the battery cell.

Hereinafter, the present disclosure will be described in detail. First, the terms and the words used in this specification and claims should not be interpreted as limited to commonly used meanings or dictionary meanings, and should be interpreted with meanings and concepts which are consistent with the technological scope of the present disclosure based on the principle that the inventors have appropriately defined concepts of the terms in order to describe the present disclosure in the best way.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a portion of a layer, a film, a region or a plate is disposed "on" another portion, this includes not only a case in which one portion is disposed "directly on" another portion, but a case in which a third portion is interposed therebetween. In contrast, when a portion of a layer, a film, a region or a plate is disposed "under" another portion, this includes not only a case in which one portion is disposed "directly under" another portion, but a case in which a third portion is interposed therebetween. In addition, in the specification of the present disclosure, "on" may include not only a case of disposed on an upper portion but also a case of disposed on a lower portion.

In addition, when a portion of a layer, a film, a region or a plate is disposed "on" another portion, this includes not only a case in which one portion is disposed "directly on" another portion, but a case in which a third portion is interposed therebetween. In contrast, when a portion of a layer, a film, a region or a plate is disposed "under" another portion, this includes not only a case in which one portion is disposed "directly under" another portion, but a case in which a third portion is interposed therebetween. In addition, in this application, "on" may include not only a case of disposed on an upper portion but also a case of disposed on a lower portion.

First Embodiment

Figure 2:
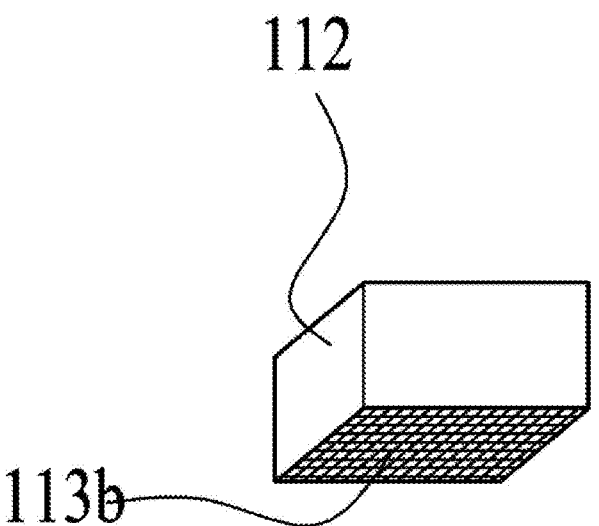
FIG. 2 is an exploded view that schematically illustrates by enlarging a lead gripper of the battery cell strength testing jig according to an exemplary embodiment of the present disclosure.
Figure 2:
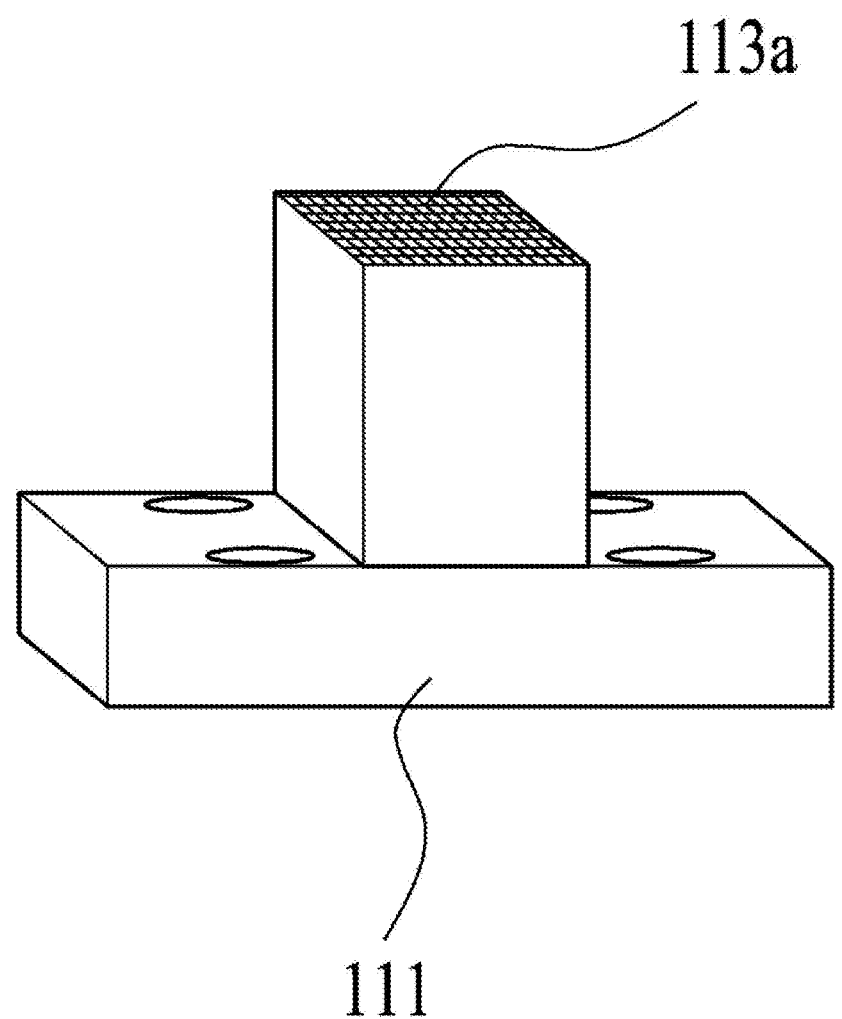
Figure 3:
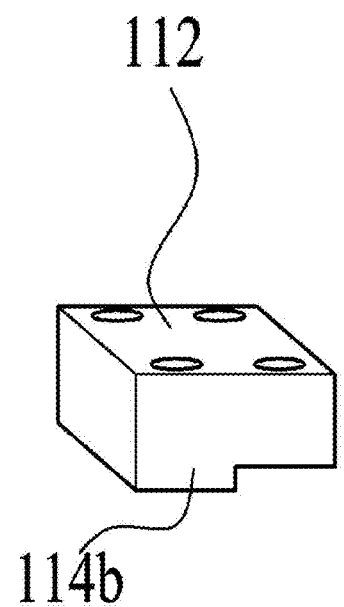
FIG. 3 is an exploded view that schematically illustrates by enlarging a modified example of the lead gripper of the battery cell strength testing jig according to an exemplary embodiment of the present disclosure.
Figure 3:
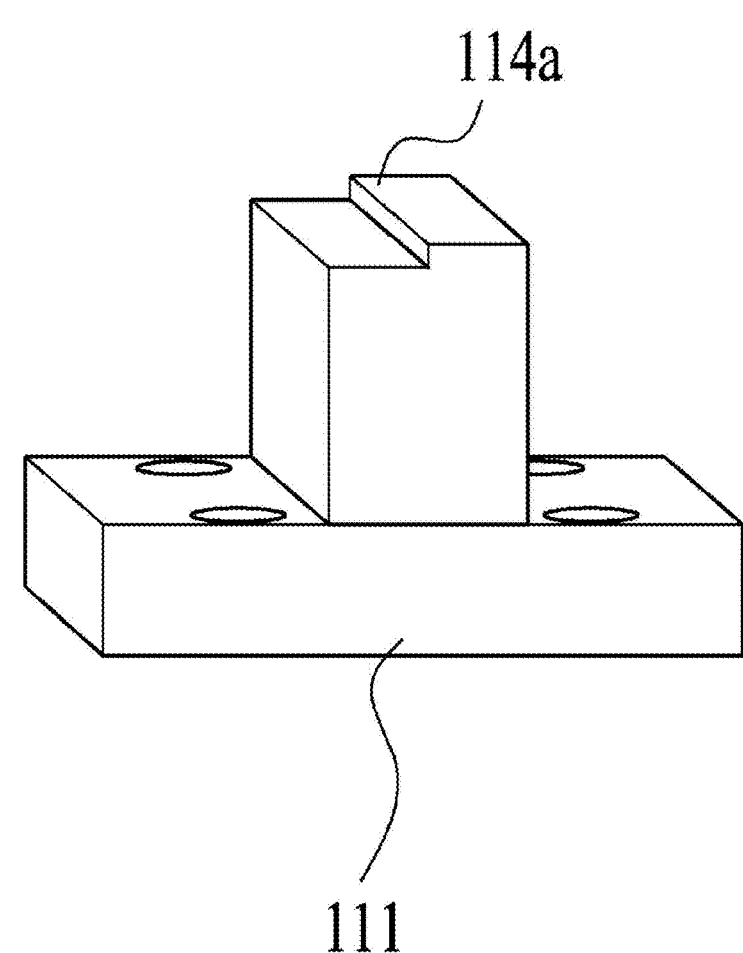
Figure 4:
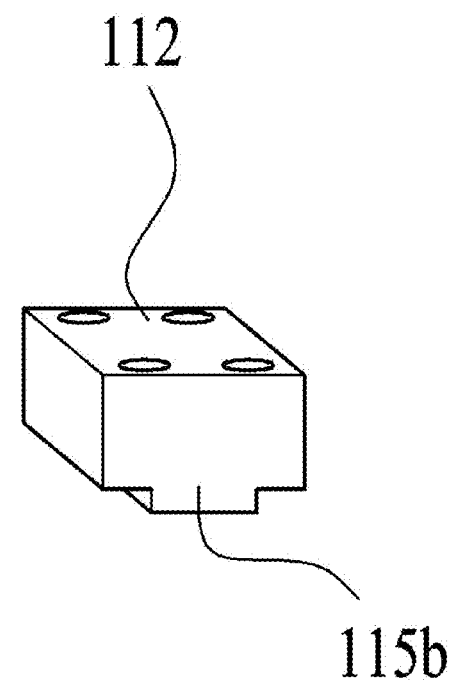
FIG. 4 is an exploded view that schematically illustrates by enlarging another modified example of the lead gripper of the battery cell strength testing jig according to an exemplary embodiment of the present disclosure.
Figure 4:
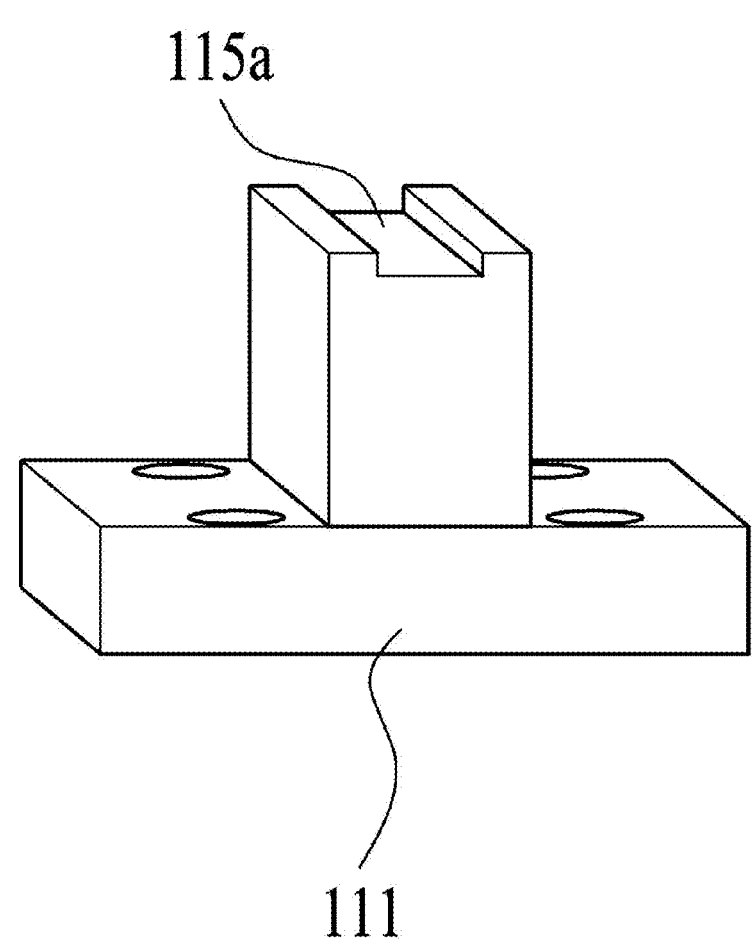
Figure 5:
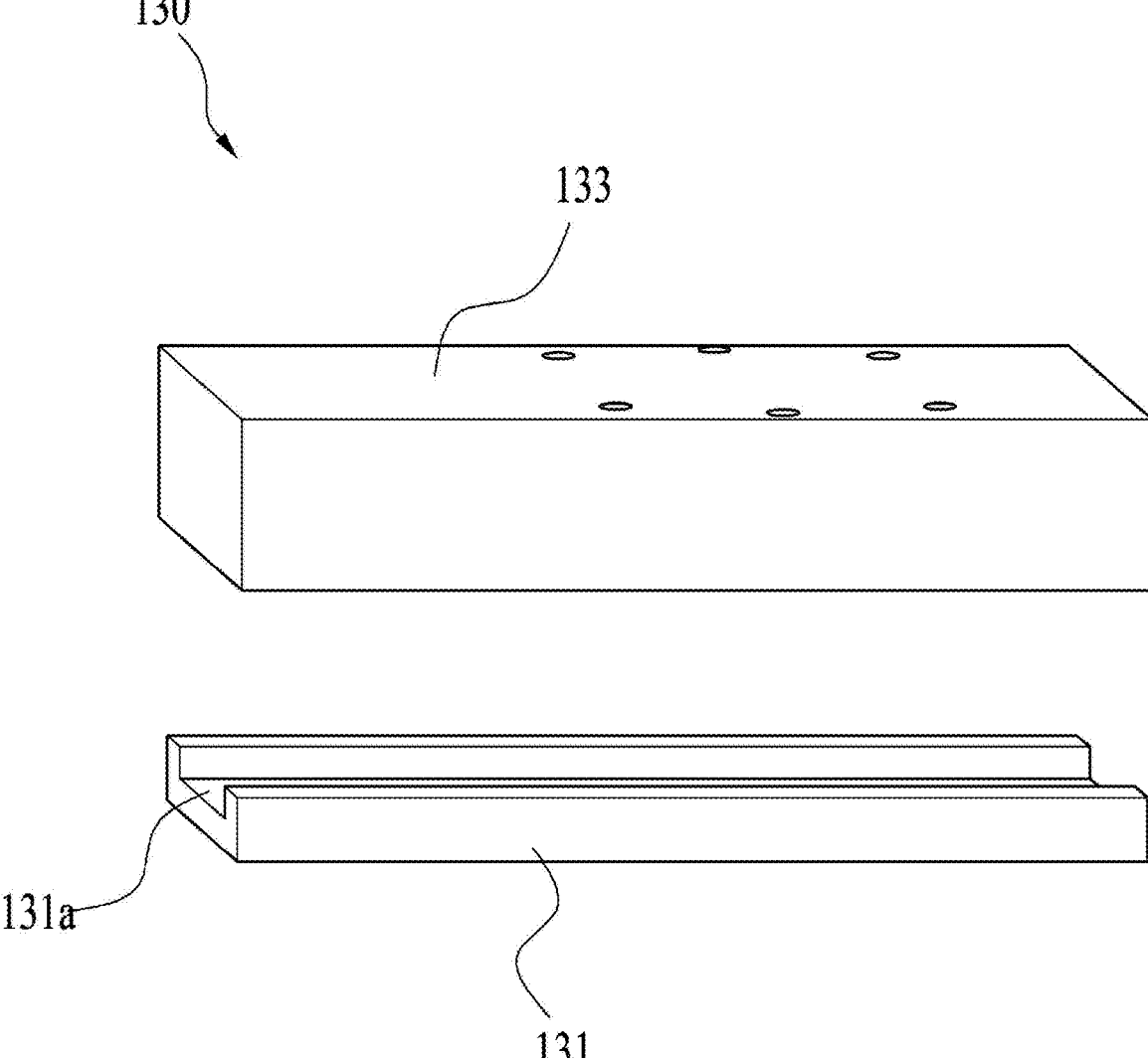
FIG. 5 is an exploded view schematically illustrating a cell fixing member of the battery cell strength testing jig according to an exemplary embodiment of the present disclosure.
Figure 6:
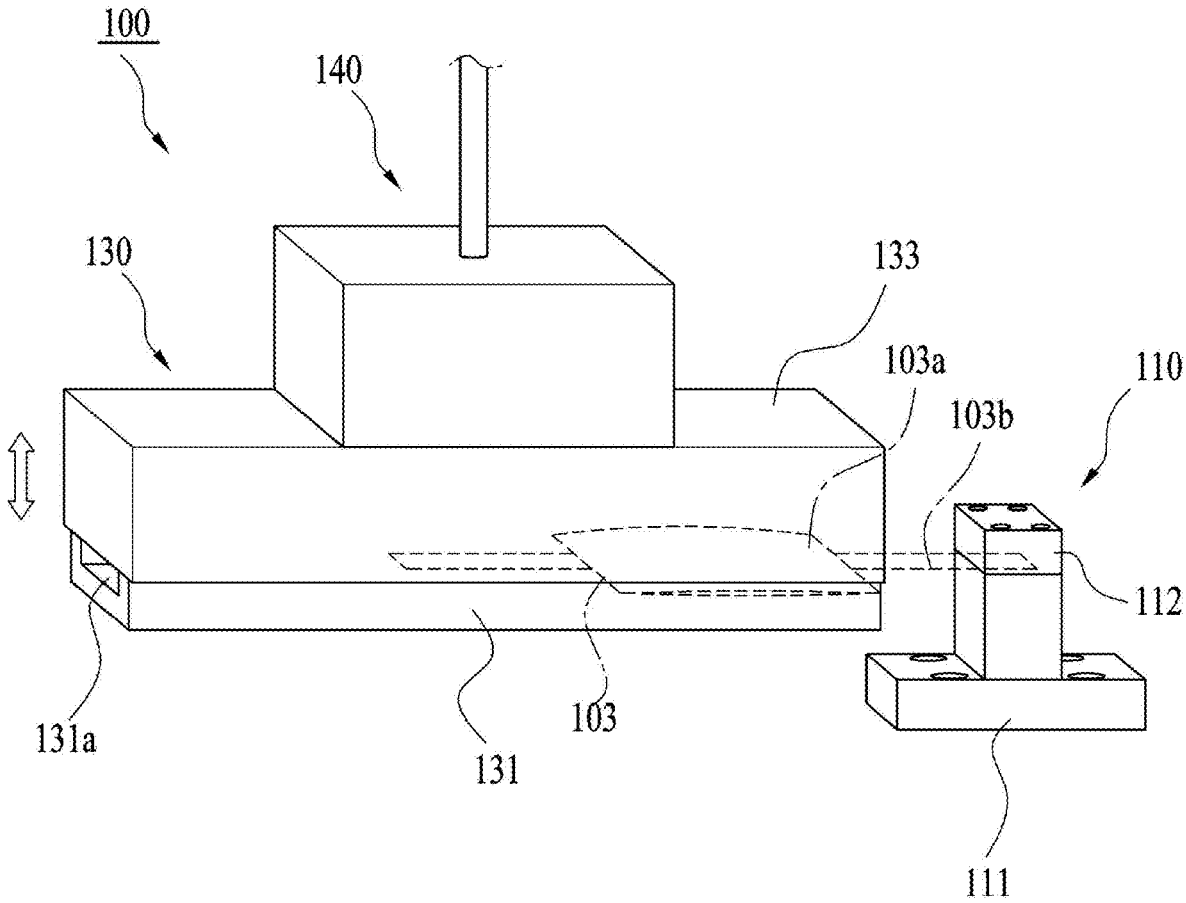
FIG. 6 is a diagram schematically representing relative displacement being generated in the battery cell installed in the battery cell strength testing jig according to an exemplary embodiment of the present disclosure.

FIG. 1 is a diagram schematically illustrating a battery cell strength testing jig according to an exemplary embodiment of the present disclosure. FIG. 2 is an exploded view that schematically illustrates by enlarging a lead gripper of the battery cell strength testing jig according to an exemplary embodiment of the present disclosure. FIG. 3 is an exploded view that schematically illustrates by enlarging a modified example of the lead gripper of the battery cell strength testing jig according to an exemplary embodiment of the present disclosure. FIG. 4 is an exploded view that schematically illustrates by enlarging another modified example of the lead gripper of the battery cell strength testing jig according to an exemplary embodiment of the present disclosure. FIG. 5 is an exploded view schematically illustrating a cell fixing member of the battery cell strength testing jig according to an exemplary embodiment of the present disclosure. FIG. 6 is a diagram schematically representing relative displacement being generated in the battery cell installed in the battery cell strength testing jig according to an exemplary embodiment of the present disclosure.

As illustrated in FIG. 1, the battery cell strength testing jig 100 according to the present disclosure is composed of a lead gripper 110 that fixes an electrode lead 103b that is drawn out from a side portion of a battery cell 103 and a cell fixing member 130 where the battery cell 103 is fixed, and a relative displacement occurs between a cell body portion 103a and an electrode lead 103b of the battery cell 103 due to the movement of the cell fixing member 130.

The lead gripper 110 includes a lower side lead gripper 111 on which the electrode lead 103b of the battery cell 103 is placed on its upper surface in order to fix the electrode lead 103b drawn out from the side portion of the battery cell 103, and an upper side lead gripper 112 coupled to the upper portion of the lower side lead gripper 111 that fixes the electrode lead 103b.

Here, the electrode lead 103b may be fixed by fitting in between the upper side lead gripper 112 and the lower side lead gripper 111 by moving the lower surface of the upper side lead gripper 112 to contact the upper surface of the lower side lead gripper 111 after settling the electrode lead 103b onto the upper surface of the lower side lead gripper 111.

In addition, the electrode lead 103b may be fixed by fitting in between the upper side lead gripper 112 and the lower side lead gripper 111 by moving the lower surface of the lower side lead gripper 112 to contact the lower surface of the upper side lead gripper 111 after settling the electrode lead 103b onto the upper surface of the lower side lead gripper 111.

Here, the lower side lead gripper 111 and the upper side lead griper 112 can be fixed after being coupled by a coupling member (not illustrated) such as a screw.

Meanwhile, the upper surface of the lower side lead gripper 111 and the lower surface of the lower side lead gripper 111 are processed by knurling process.

In other words, in order to prevent the electrode lead 103b of the battery cell 103 that is fixed by fitting in between the upper side lead gripper 112 and the lower side lead gripper 111 from falling out or being disengaged, as illustrated in FIG. 2, a lattice-shaped knurling portion 113a, 113b is formed on the upper surface of the lower side lead gripper 111 and the lower surface of the lower side lead gripper 111 through a knurling process.

Meanwhile, as a modified example, as illustrated in FIG. 3, at least one of the upper surface of the lower lead gripper 111 or the lower surface of the upper lead gripper 112 has a stepped portion 114a,114b the other one is provided with a stepped portion 114b,114a matching the stepped portion 114a,114b and the electrode lead is fixed by fitting in between the matching stepped portions In other words, while the stepped portion 114a, 114b is each formed on the upper surface of the lower side lead gripper 111 and the lower surface of the upper side lead gripper 112 in order to allow the electrode lead 103*b* of the battery cell 103 to be easily fixed by fitting into the lead gripper 110, each of the stepped portion 114*a*, 114*b* is mutually matched with each other to enable coupling.

By the structure as described above, the electrode lead 103*b* of the battery cell 103, by being fixed and fitted in between the lower side lead gripper 111 and the stepped portion of the upper side lead gripper 112, can be prevented from falling out or being disengaged between the lower side lead gripper 111 and the upper side lead gripper 112.

Here, while the stepped portion 114*a*, 114*b* of the upper portion of the lower side lead gripper 111 and the lower portion of the upper side gripper may be formed in the form of a multi-level staircase, it can also be made to fix the electrode lead 103*b* of the battery cell 103 by being mutually matched, but it is not limited thereto.

Meanwhile, as a modified example, as illustrated in FIG. 4, a lead groove 115*a* is formed on at least one of the upper surface of the lower side lead gripper 111 or the lower surface of the upper side lead gripper 112, and a coupling piece 115*b* that is coupled to the lead groove 115*a* may be formed on the other surface.

In other words, the lead groove 115*a* is formed on either the upper surface of the lower side lead gripper 111 or the lower surface of the upper side lead gripper 112 to allow the electrode lead 103*b* of the battery cell 103 to be easily fixed by fitting into the lead gripper 110, and the coupling piece 115*b* that is coupled to the lead groove 115*a* may be formed on either the lower surface of the upper side lead gripper 112 or the upper surface of the lower side lead gripper 111.

By the structure as described above, the electrode lead 103*b* of the battery cell 103 is placed in the lead groove 115*a* of the lower side lead gripper 111 or the upper side lead gripper 112, and the electrode lead 103*b* located in the lead groove 115*a* can be easily fixed by pressing and coupling the coupling piece 115*b* of the upper side lead gripper 112 or the lower side lead gripper 111 to the lead groove 115*a*.

Meanwhile, in order to prevent the electrode lead 103*b* from falling out or being disengaged form the lower side lead gripper 111 and the upper side lead gripper 112, the upper surface of the lower lead gripper 111 and the lower surface of the upper lead gripper 112 may have a rough form, or they may have multiple protrusions and grooves formed, and other various modifications may be implemented.

The cell fixing member 130 fixes the battery cell 103, and it is installed so that it is movable in the thickness direction of the battery cell 103.

In other words, the battery cell 103 is fixedly installed inside the cell fixing member 130, and it is installed so that it is movable in the thickness direction, which is the swelling direction, of the battery cell 103.

Here, as illustrated in FIG. 5, the cell fixing member 130 includes a cell holder 131 in which the cell body portion 103*a* of the battery cell 103 is settled, and a fixing block 133 that is coupled to the upper of the cell holder 131.

The cell holder 131 has a settling groove 131*a* formed on the upper surface in which the battery cell 103 is settled. Here, the settling groove 131*a* is formed at the center of the upper surface of the cell holder 131, and the width and the depth within the settling groove 131*a* are formed to correspond to the width and length of the body portion of the battery cell 103.

The fixing block 133 is coupled to the upper of the cell holder 131 through a fastening member (not illustrated) such as a bolt, and it prevents the disengagement of the battery cell 103 settled inside the cell holder 131.

Meanwhile, the upper portion of the cell fixing member 130 has a moving member 140 for moving the cell fixing member 130 by being fixed to the fixing block 133, and the moving member 140 moves the cell fixing member 130 in the thickness direction of the battery cell 103.

Also, the moving member 140 may be provided at the lower portion of the cell holder 131 to move the cell fixing member 130 in the thickness direction of the battery cell 103.

Here, the moving member 140, as illustrated in FIG. 6, can be a tensile strength tester, can be made of a wire or a rope, etc., and other various modifications may be implemented.

Here, the battery cell 103 that gets fixed onto the cell fixing member 130 may be a two-way battery cell 103 that has electrode leads 103*b* on both sides, or the battery cell 103 that is fixed onto the cell fixing member 130 may be a one-way battery cell 103 that has an electrode lead on only one side.

Meanwhile, if the battery cell 103 that gets fixed onto the cell fixing member 130 is the two-way battery cell 103, a lead gripper 110 may each be on one side and the other side of the cell fixing member 130, each electrode lead 103*b* drawn out from both sides of the battery cell 103 may be fixed by each lead gripper 111,112.

When each electrode lead 103*b* of the battery cell 103 gets fixed to a lead gripper 110 that is each located on one side and the other side of the cell fixing member 130, the movement of the cell fixing member 130 can simultaneously generate relative displacement between the cell body portion 103*a* of the battery cell 103 and each electrode lead 103*b*.

Hereinafter, the process of generating relative displacement in the battery cell through the battery cell strength testing jig according to an exemplary embodiment of the present disclosure will be schematically described by referring to FIG. 6.

First, while fixing the battery cell 103 to the battery cell strength testing jig 100 according to an exemplary embodiment of the present disclosure, the cell body portion 103*a* of the battery cell 103 should be settled and fixed to the cell fixing member 130, and the electrode lead 103*b* of the battery cell 103 should be fixed to the lead gripper 110.

Here, the cell body portion 103*a* of the battery cell 103 is settled to the settling groove 131*a* formed in the cell holder 131 of the cell fixing member 130, and the electrode lead 103*b* of the battery cell 103 is fixed between the lower side lead gripper 111 and the upper side lead gripper 112.

Here, the electrode lead 103*b* fixed by fitting in to the lower side lead gripper 111 and the upper side lead gripper 112 may be prevented from falling out or being disengaged by a knurling portion 113*a*, 113*b* that is formed on the upper surface of the lower side lead gripper 111 and the lower surface of the upper side lead gripper 112 through a knurling process.

As described above, relative displacement between the cell body portion 103*a* and the electrode lead 103*b* of the battery cell 103 may be generated by moving the cell fixing member 130 through the moving member 140 after fixing the battery cell 103 to the lead gripper 110 and the cell fixing member 130, and this allows the strength between the cell body portion 103*a* and the electrode lead 103*b* to be measured.

Second Embodiment

Figure 7:
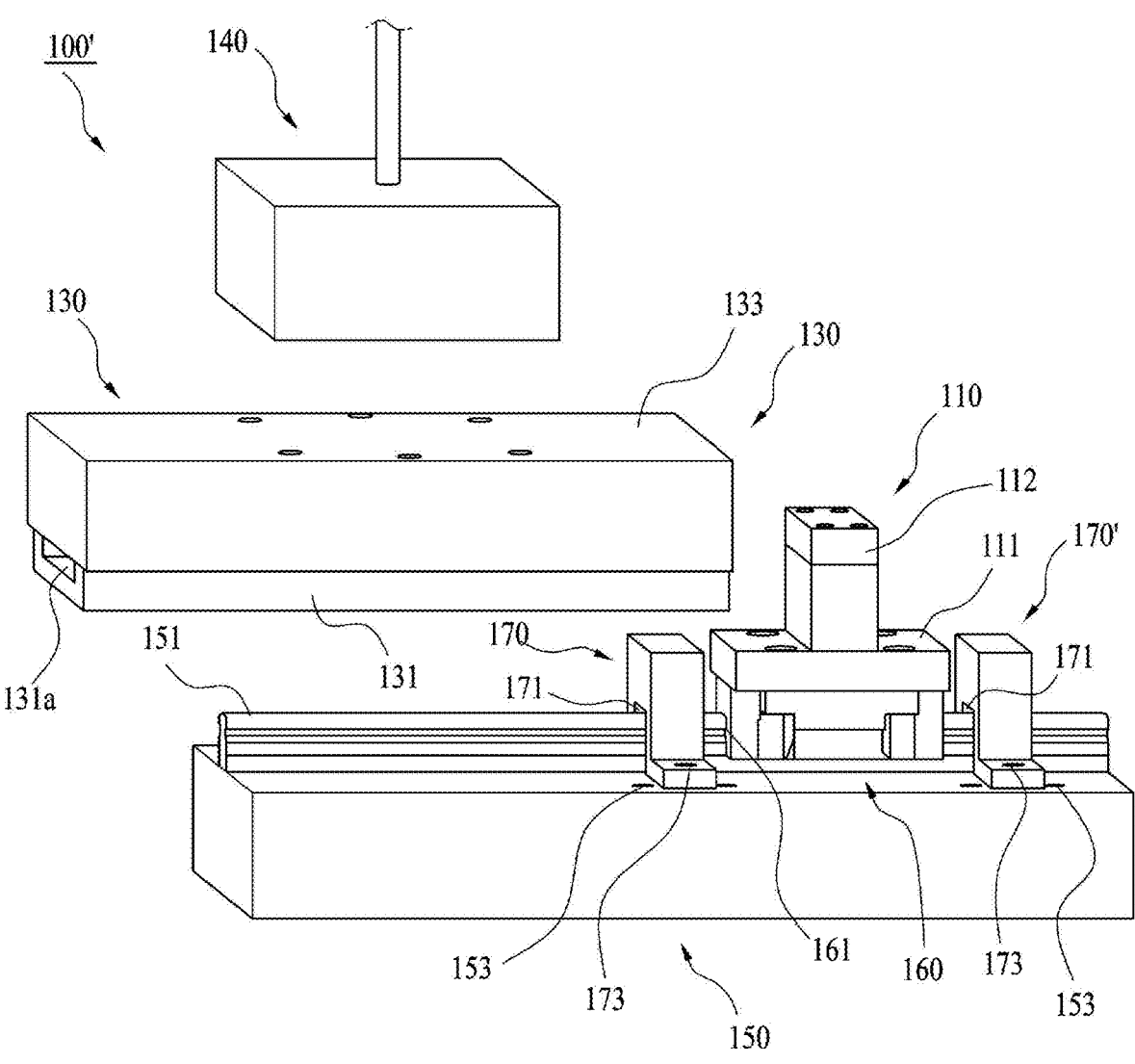
FIG. 7 is a diagram schematically illustrating the battery cell strength testing jig according to another exemplary embodiment of the present disclosure.
Figure 8:
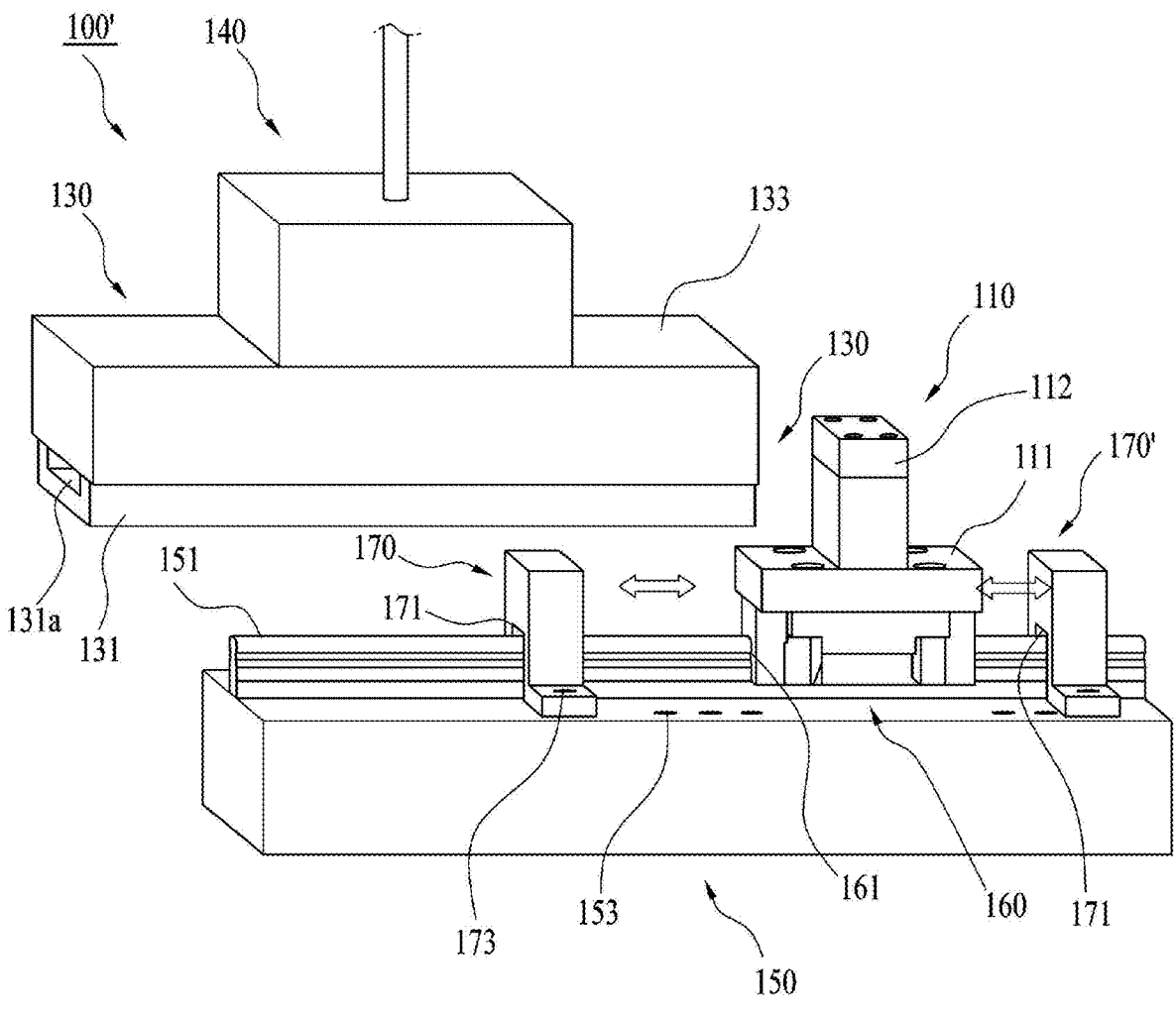
FIG. 8 and FIG. 9 are diagrams schematically illustrating an operational process of a stopper that fixes the lead gripper in the battery cell strength testing jig according to another exemplary embodiment of the present disclosure.
Figure 9:
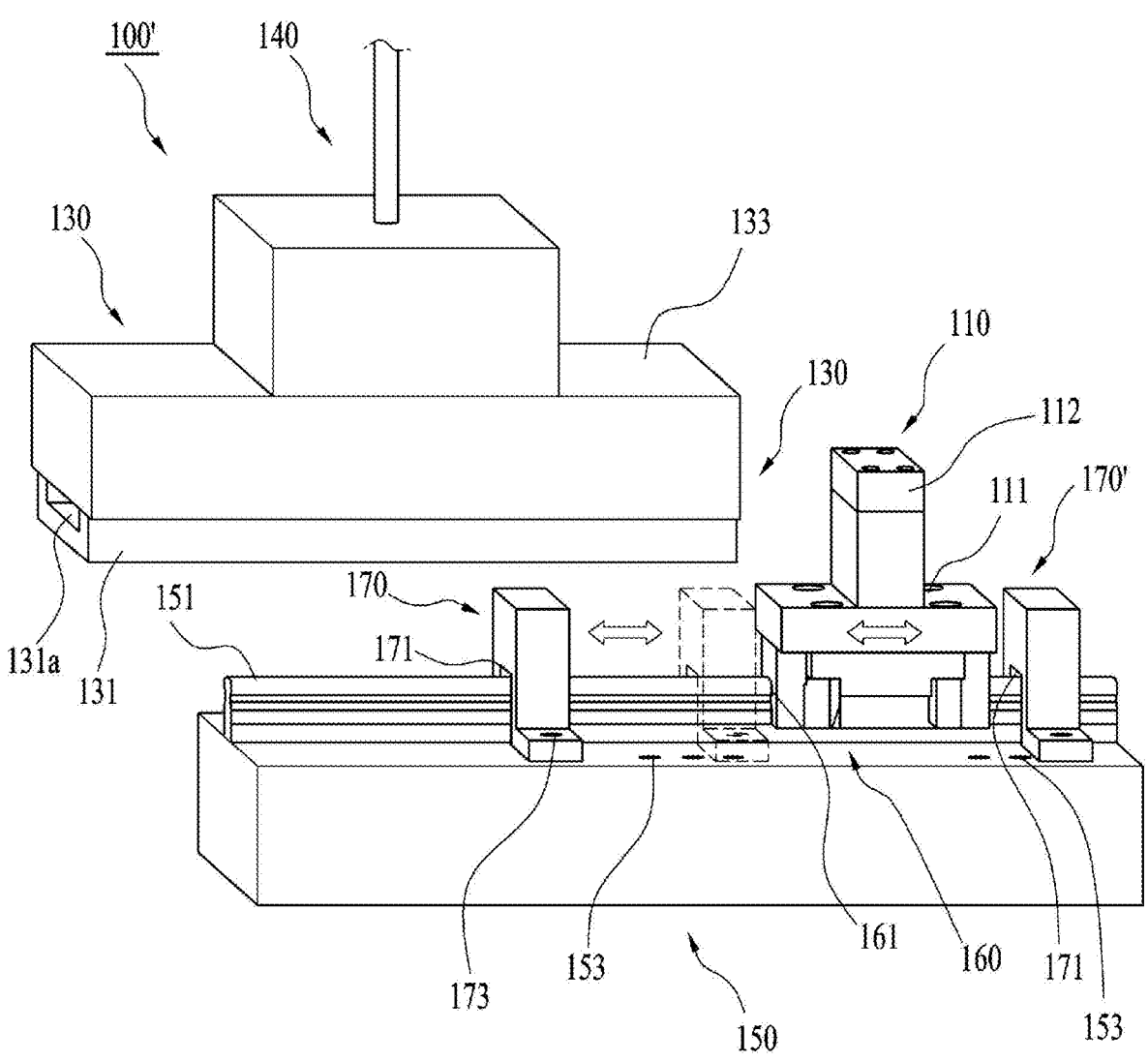
Figure 10:
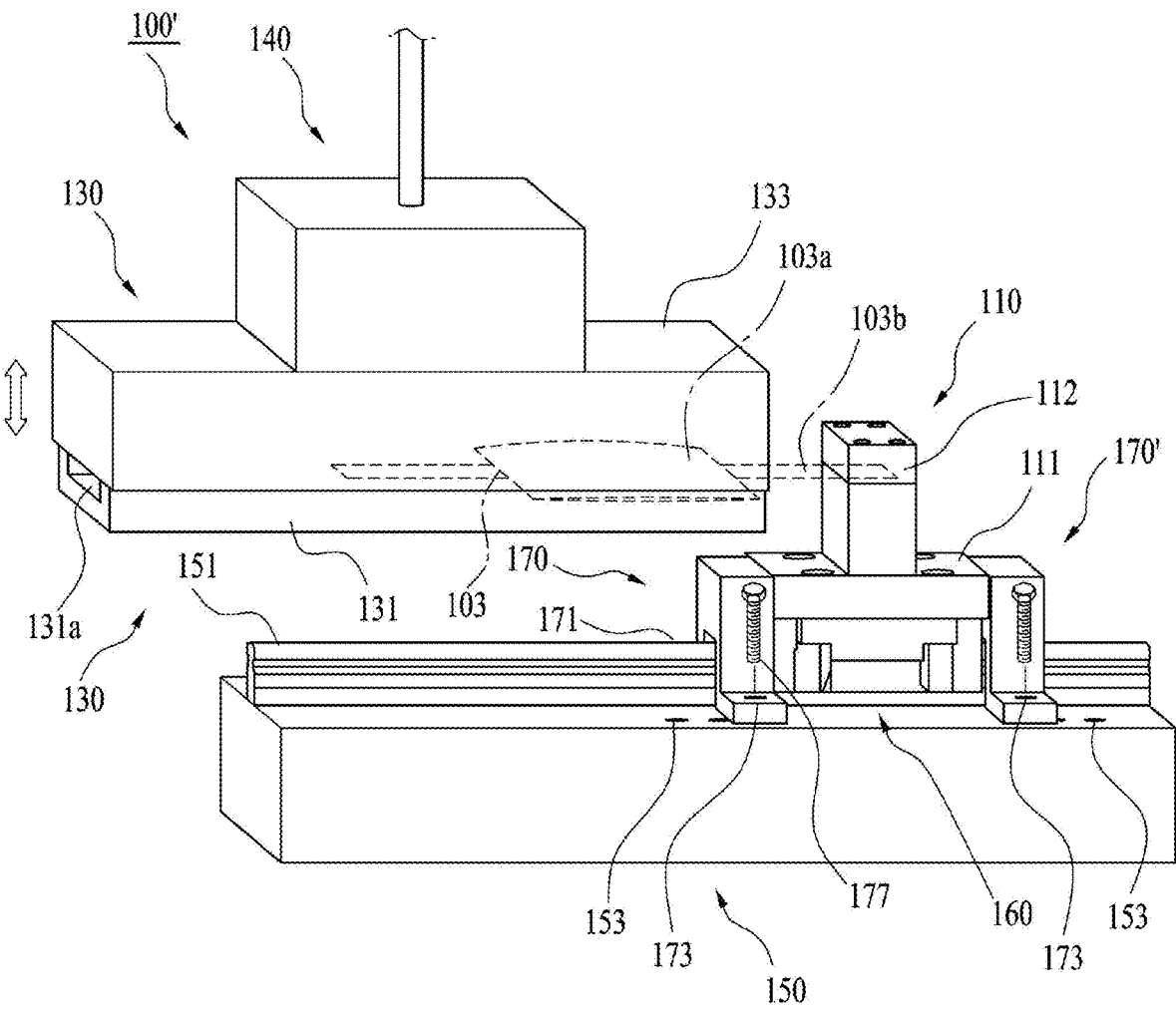
FIG. 10 is a diagram schematically representing relative displacement being generated in the battery cell installed in the battery cell strength testing jig according to another exemplary embodiment of the present disclosure.

FIG. 7 is a diagram schematically illustrating the battery cell strength testing jig according to another exemplary embodiment of the present disclosure. FIG. 8 and FIG. 9 are diagrams schematically illustrating the operational process of a stopper that fixes the lead gripper in the battery cell strength testing jig according to another exemplary embodiment of the present disclosure. FIG. 10 is a diagram schematically representing relative displacement being generated in the battery cell installed in the battery cell strength testing jig according to another exemplary embodiment of the present disclosure.

The battery cell strength testing jig 100' according to the present exemplary embodiment, as illustrated in FIG. 7, the lower portion of the lead gripper 110 has a coupled base 150 that allows the lead gripper to slide, so that the lead gripper 110 that fixes the electrode lead of the battery cell 103 is movable corresponding to the length of the electrode.

Here, the upper surface of the base 150 has a rail 151 in a protruded form, and the lead gripper has a sliding block 160 in which a rail groove 161 is formed and coupled to the rail 151 to be able to slide along.

In other words, a rail 151 gets protruded in the longitudinal direction at the center of the upper surface of the base 150, a sliding block 160 is provided at the lower portion of the lead gripper 110, and a rail groove 161 is formed on the lower surface of the sliding block 160 and is coupled to the rail 151 to be able to move in the longitudinal direction.

By the structure as described above, the lead gripper 110 moves on the base 150 along the rail 151 that is coupled to the rail groove 161 of the sliding block 160 which is provided at its lower portion, and after it is moved corresponding to the length of the electrode lead 103b of the battery cell 103, the electrode lead 103b is fitted and fixed.

Here, a stopper 170,170' is coupled to the rail 151 of the base 150 to regulate the movement of the lead gripper 110.

In other words, in order to fix the lead gripper 110 before and after it moves on the base 150, the stopper 170,170' for regulating the movement of the lead gripper 110 by contacting the lead gripper 110 is coupled to the rail 151.

Here, a coupling groove 171 is formed on the stopper 170,170' to be movably coupled to the rail 151.

As such, the stopper 170,170' is movably coupled to the rail 151, and it can fix the lead gripper 110 by contacting the front and the rear of the lead gripper 110 and regulating its movement.

Here, a coupling hole 173 is formed through both ends of the stopper 170,170', and multiple fastening grooves 153 are formed on the upper surface of the base 150, and by fastening a fastening member 177 such as a bolt to the coupling hole 173 and fastening grooves 153, the stopper 170,170' can be fixed on the base 150 to regulate the movement of the lead gripper 110 on the base 150.

Hereinafter, the process of generating relative displacement in the battery cell through the battery cell strength testing jig according to another exemplary embodiment of the present disclosure will be schematically explained by referring to FIG. 8 through FIG. 10.

First, in the case where the lengths of the electrode lead 103b protruding from the side of the battery cell 103 are different, the battery cell strength testing jig according to the present exemplary embodiment can generate relative displacement in the battery cell 103 after moving the lead gripper 110 to correspond to the length of the electrode lead 103b and fixing the lead gripper 110 positioned to correspond to the length of the electrode lead 103b.

In other words, while fixing the battery cell 103 to the battery cell strength testing jig 100', the cell body portion 103a of the battery cell 103 is settled and fixed to the cell fixing member 130, the lead gripper 110 is moved back and forth on the base 150 to correspond to the length of the electrode lead 103, and the electrode lead 103b is fixed to the lead gripper 110 positioned to correspond to the length of the electrode lead 103b.

Here, the cell body portion 103a of the battery cell 103 is settled to the settling groove 131a formed in the cell holder 131 of the cell fixing member 130, and the electrode lead 103b of the battery cell 103 is fixed between the lower side lead gripper 111 and upper side lead gripper 112.

Also, the stopper 170,170' is moved on the base 150 so as to come in contact with the front and the rear of the lead gripper 110, and after positioning the coupling hole 173 formed on both ends of the stopper 170,170' to correspond to the fastening groove 153 on the base, the stopper 170,170' is fixed by fastening the fastening member 177 to the coupling hole 173 and fastening groove 153, and at the same time, the lead gripper 110, which is positioned so that its front and rear come into contact with each stopper 170,170', is fixed.

As illustrated FIG. 10, after fixing the battery cell 103 to the lead gripper 110 and the cell fixing member 130, relative displacement between the cell body portion 103a and electrode lead 103b of the battery cell 103 can be generated by moving the cell fixing member 130 through the moving member 140 linearly in a thickness direction of the battery cell 103 away from the base 150, and this allows the strength between the cell body portion 103a and the electrode lead 103b to be measured.

Third Embodiment

Figure 11:
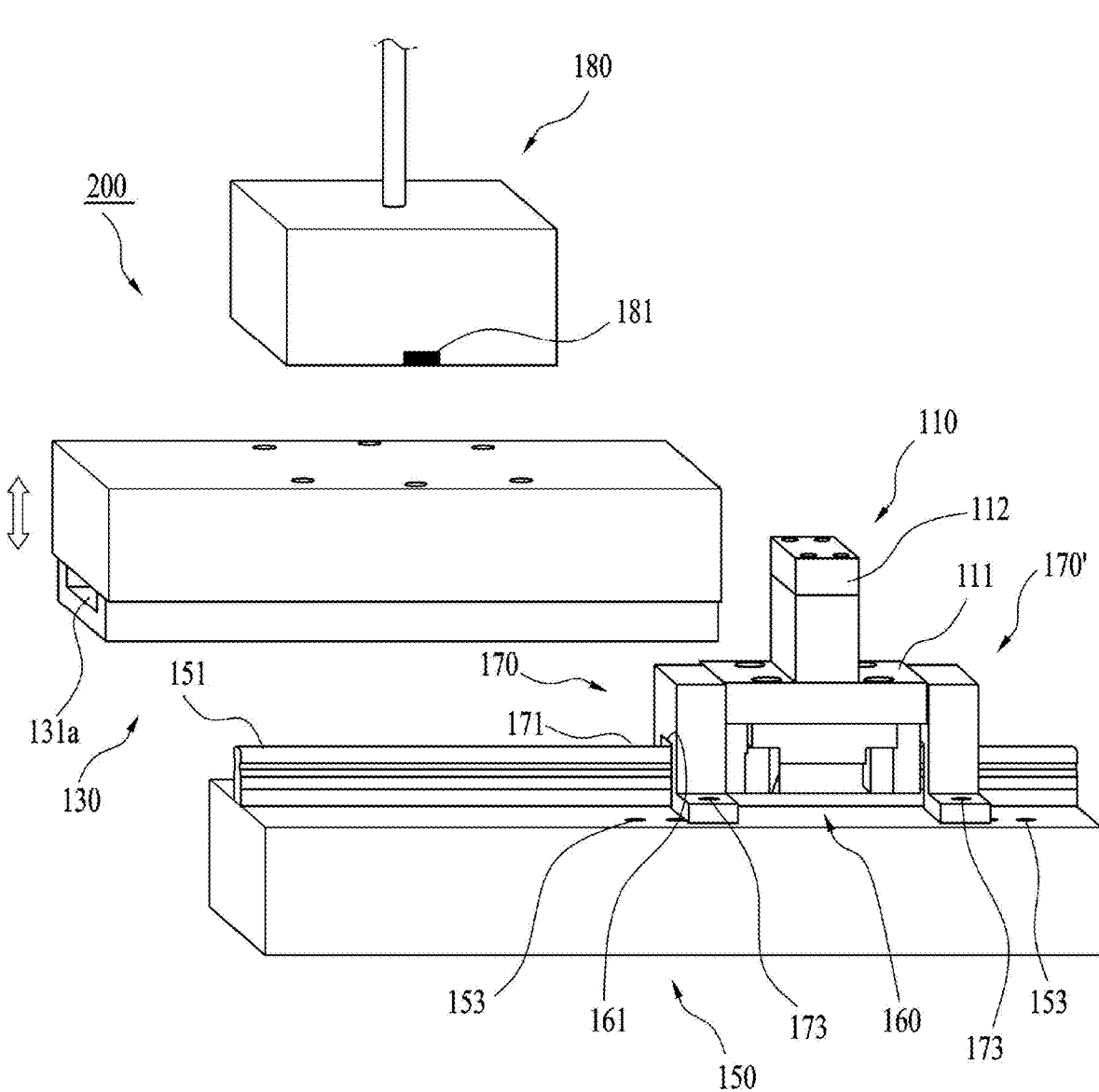
FIG. 11 is a diagram schematically illustrating a battery cell strength testing apparatus according to another exemplary embodiment of the present disclosure.
Figure 12:
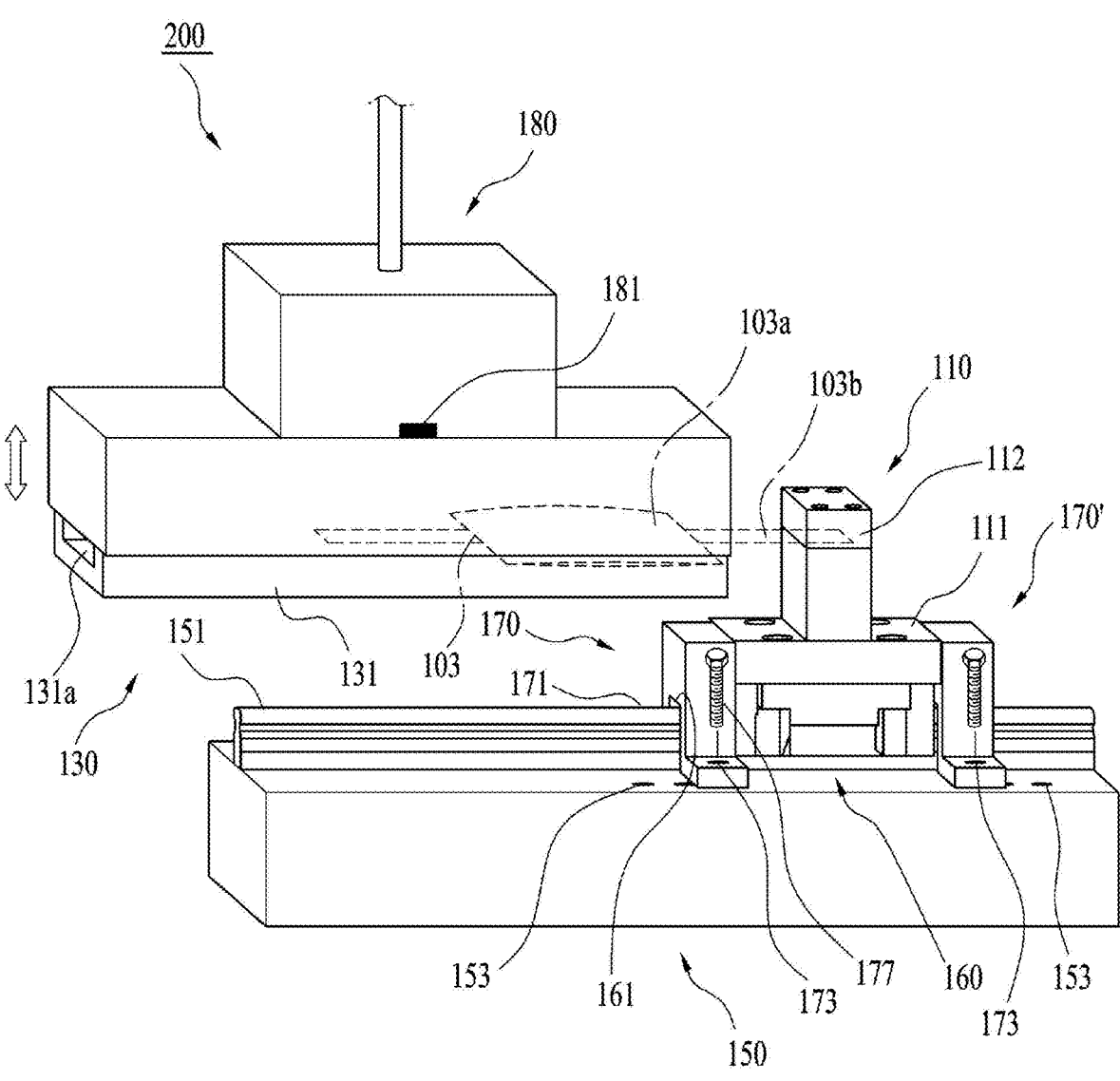
FIG. 12 is a diagram schematically representing a strength test being done on the battery cell by generating relative displacement in the battery cell installed in the battery cell strength testing apparatus according to another exemplary embodiment of the present disclosure.

FIG. 11 is a diagram schematically illustrating the battery cell strength testing apparatus according to another exemplary embodiment of the present disclosure. FIG. 12 is a diagram schematically representing a strength test being done on the battery cell by generating relative displacement in the battery cell installed in the battery cell strength testing apparatus according to another exemplary embodiment of the present disclosure.

Applying a tensile strength tester 180 to the battery cell strength testing jig 100' according to an exemplary embodiment of the present disclosure generates relative displacement between the cell body portion 103a and electrode lead 103b of the battery cell 103, and this allows the strength between the cell body portion 103a and the electrode lead 103b of the battery cell 103 to be measured by simulating swelling in which the battery cell 103 swells in the surface direction.

For this purpose, the battery cell strength testing apparatus 200 has the tensile strength tester 180 in the upper portion of the cell fixing member 130 of the battery cell strength testing jig 100'.

The tensile strength tester 180 generates relative displacement in the cell body portion 103a with respect to the electrode lead 103b by moving the cell fixing member 130 in the thickness direction of the battery cell 103, thereby a load is applied to the cell body portion 103a of the battery cell 103.

In other words, the tensile strength tester 180, by being coupled to the cell fixing member 130, moves the cell fixing member 130 in the thickness direction, which is also the swelling direction, of the battery cell 103, thereby a load is applied to the cell body portion 103a of the battery cell 103, relatively displacing the cell body portion 103a with respect to the electrode lead 103b.

As such, the tensile strength tester 180 measures the limit load at the point when the electrode lead 103b is disconnected from the body portion 103a by applying load to the cell body portion 103a of the battery cell 103 by moving the cell fixing member 130, and this allows the strength of the cell body portion 103a and the terrace portion of the electrode lead 103b to be tested.

Meanwhile, the tensile strength tester 180 has a load detection sensor 181, and the load or the limit load applied to the cell body portion 103a or the cell terrace portion can be measured by the detection sensor 181.

As above, the present disclosure has been described with reference to exemplary embodiments, but it should be understood by those skilled in the art or those of ordinary skill in the art that the present disclosure can be variously modified and changed without departing from the spirit and technical scope of the present disclosure described in the accompanying claims.

REFERENCE NUMERALS

100,100': BATTERY CELL STRENGTH TESTING JIG
103: BATTERY CELL
103A: CELL BODY PORTION
103B: ELECTRODE LEAD
110: LEAD GRIPPER
111: LOWER SIDE LEAD GRIPPER
112: UPPER SIDE LEAD GRIPPER
113A,113B: KNURLING PORTION
114A,114B: STEPPED PORTION
115A: LEAD GROOVE
115B: COUPLING PIECE
130: CELL FIXING MEMBER
131: CELL HOLDER
131A: SETTLING GROOVE
133: FIXING BLOCK
140: MOVING MEMBER
150: BASE
151: RAIL
153: FASTENING GROOVE
160: SLIDING BLOCK
161: RAIL GROOVE
170,170': STOPPER
171: COUPLING GROOVE
173: COUPLING HOLE
177: FASTENING MEMBER
180: TENSILE STRENGTH TESTER
181: LOAD DETECTION SENSOR
200: BATTERY CELL STRENGTH TESTING APPA-
   RATUS

The invention claimed is:

1. A battery cell strength testing jig comprising:
a base;
a lead gripper in which an electrode lead drawn out from a side portion of a battery cell is fixed, the lead gripper coupled to the base; and
a cell fixing member in which the battery cell is fixed, the cell fixing member being installed to be movable linearly in a thickness direction of the battery cell away from the base,
wherein a relative displacement occurs between a cell body portion and the electrode lead of the battery cell when the cell fixing member is linearly moved.

2. The battery cell strength testing jig of claim 1, wherein the lead gripper includes a lower side lead gripper and an upper side lead gripper,
wherein the electrode lead of the battery cell is placed on an upper surface of the lower side lead gripper, and wherein the upper side lead gripper is coupled to an upper portion of the lower side lead gripper to fix the electrode lead.

3. The battery cell strength testing jig of claim 2, wherein the upper surface of the lower side lead gripper and a lower surface of the upper side lead gripper are knurled.

4. The battery cell strength testing jig of claim 2, wherein at least one of the upper surface of the lower lead gripper or the lower surface of the upper lead gripper includes a first stepped portion,
wherein the other one of the at least one of the upper surface or the lower surface is provided with a second stepped portion matching the first stepped portion, and
wherein the electrode lead is fixed between the first stepped portion and the second stepped portion.

5. The battery cell strength testing jig of claim 2, wherein at least one of the upper surface of the lower lead gripper or the lower surface of the upper lead gripper includes a lead groove in which the electrode lead is placed, and
wherein the other one of the at least one of the upper surface or the lower surface is provided with a coupling piece coupled to the lead groove.

6. The battery cell strength testing jig of claim 1, wherein the cell fixing member includes a cell holder in which the battery cell is placed, and
wherein the cell fixing member includes a fixing block coupled to an upper part of the cell holder.

7. The battery cell strength testing jig of claim 6, wherein the cell holder includes a seating groove in which the battery cell is placed.

8. The battery cell strength testing jig of claim 6, wherein a moving member coupled to the fixing block is provided above the cell fixing member to move the cell fixing member.

9. The battery cell strength testing jig of claim 1, wherein the battery cell fixed onto the cell fixing member is at least one of a two-way battery cell that includes electrode leads on both sides or a one-way battery cell that includes an one-way battery electrode lead on one side.

10. The battery cell strength testing jig of claim 1, wherein the base, to which the lead gripper is slidably coupled, is provided below the lead gripper so that the lead gripper that fixes the electrode lead is movable corresponding to a length of the electrode.

11. The battery cell strength testing jig of claim 10, wherein the base includes a rail protruding from upper surface of the base, and
wherein the lead gripper is provided with a sliding block having a rail groove slidably coupled to the rail.

12. The battery cell strength testing jig of claim 11, wherein a stopper is coupled to rail of the base to regulate a movement of the lead gripper.

13. The battery cell strength testing jig of claim 12, wherein the stopper is coupled to a front of the lead gripper and a rear of the lead gripper, and
wherein the stopper fixes the lead gripper.

14. A battery cell strength testing apparatus, comprises:
a base;
a lead gripper in which an electrode lead drawn out from a side portion of a battery cell is fixed, the lead gripper coupled to the base;
a cell fixing member in which the battery cell is fixed, the cell fixing member being installed to be movable linearly in a thickness direction of the battery cell away from the base; and
a tensile strength tester coupled to an upper portion of the cell fixing member;

wherein the tensile strength tester relatively displaces a cell body portion with respect to the electrode lead to apply a load to the cell body portion of the battery cell when the cell fixing member is moved linearly in the thickness direction of the battery cell.

15. The battery cell strength testing apparatus of claim 14, wherein the tensile strength tester is provided with a load detection sensor to measure or limit the load applied to the cell body portion or a cell terrace portion of the battery cell.

16. The battery cell strength testing apparatus of claim 14, wherein the base, to which the lead gripper is slidably coupled, is provided below the lead gripper so that the lead gripper that fixes the electrode lead is movable corresponding to a length of the electrode.

17. The battery cell strength testing jig of claim 16, wherein the base includes a rail protruding from upper surface of the base, and wherein the lead gripper is provided with a sliding block having a rail groove slidably coupled to the rail.

18. The battery cell strength testing jig of claim 17, wherein a stopper is coupled to rail of the base to regulate a movement of the lead gripper.

19. The battery cell strength testing jig of claim 18, wherein the stopper is coupled to a front of the lead gripper and a rear of the lead gripper, and wherein the stopper fixes the lead gripper.

\* \* \* \* \*